(12) United States Patent
Dempsey et al.

(10) Patent No.: US 10,684,188 B2
(45) Date of Patent: Jun. 16, 2020

(54) SYSTEM AND METHOD FOR DETERMINING DUCT LEAKAGE IN A HVAC SYSTEM

(71) Applicant: Carrier Corporation, Farmington, CT (US)

(72) Inventors: Daniel J. Dempsey, Carmel, IN (US); Jun Pyo Lee, Zionsville, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 496 days.

(21) Appl. No.: 15/355,215

(22) Filed: Nov. 18, 2016

(65) Prior Publication Data

US 2017/0138814 A1 May 18, 2017

Related U.S. Application Data

(60) Provisional application No. 62/256,817, filed on Nov. 18, 2015.

(51) Int. Cl.
*G01M 3/26* (2006.01)
*F24F 11/30* (2018.01)
*F24F 7/08* (2006.01)

(52) U.S. Cl.
CPC ............... *G01M 3/26* (2013.01); *F24F 7/08* (2013.01); *F24F 11/30* (2018.01)

(58) Field of Classification Search
CPC .................................................. G01M 3/26
See application file for complete search history.

(56) References Cited

U.S. PATENT DOCUMENTS

| 5,984,773 | A | 11/1999 | Gervais et al. |
| 7,207,228 | B2 | 4/2007 | Wang |
| 7,516,649 | B2 | 4/2009 | Locke et al. |
| 8,235,777 | B2 | 8/2012 | Stanimirovie |
| 8,511,146 | B2 | 8/2013 | Brooks |
| 9,188,508 | B1* | 11/2015 | Meyer ................ G01M 99/005 |
| 2004/0219875 | A1* | 11/2004 | Mills ....................... F24F 11/30 454/256 |
| 2006/0116067 | A1 | 6/2006 | Federspiel |
| 2008/0156887 | A1* | 7/2008 | Stanimirovic ........... F24F 11/30 236/12.1 |
| 2008/0160901 | A1* | 7/2008 | Stanimirovic ........... F24F 11/30 454/239 |

(Continued)

FOREIGN PATENT DOCUMENTS

| CN | 101532901 A | 9/2009 |
| CN | 201434752 Y | 3/2010 |

(Continued)

OTHER PUBLICATIONS

User Manual for G12, G12R and G12X Series, Lennox Industries Inc., Aug. 1990.*

*Primary Examiner* — Alexander A Mercado
(74) *Attorney, Agent, or Firm* — Cantor Colburn LLP (57) ABSTRACT

A system and method of determining duct leakage in an HVAC system including an HVAC unit assembly operably coupled to a system controller, the method including operating the system controller to determine system leakage data, operating the system controller to determine supply leakage data, and operating the system controller to determine a duct leakage measurement based in part on the system leakage data and the supply leakage data.

11 Claims, 6 Drawing Sheets

(56) References Cited

U.S. PATENT DOCUMENTS

2011/0247398 A1    10/2011   Breed
2014/0260552 A1     9/2014   Morris et al.
2015/0073732 A1     3/2015   Lee et al.
2015/0338314 A1*   11/2015   Meyer .................. G01M 99/005
                                                                            73/40

FOREIGN PATENT DOCUMENTS

CN         201607311 U    10/2010
CN         202158876 U     3/2012
CN         203203771 U     9/2013
FI              97749 B    10/1996

\* cited by examiner

SYSTEM AND METHOD FOR DETERMINING DUCT LEAKAGE IN A HVAC SYSTEM

The present application is a nonprovisional patent application, which claims priority to 62/256,817, filed Nov. 18, 2016, which is herein incorporated in its entirety.

TECHNICAL FIELD OF THE DISCLOSED EMBODIMENTS

Technical Field of the Disclosed Embodiments

The presently disclosed embodiments generally relate to heating, ventilation and air conditioning (HVAC) systems, and more particularly, to a system and method for determining duct leakage in a HVAC system.

Background of the Disclosed Embodiments

Generally, a duct leakage tester is a diagnostic tool designed to measure the airtightness of forced air heating, ventilating and air-conditioning (HVAC) ductwork. A duct leakage tester typically consists of a calibrated fan for measuring an air flow rate and a pressure sensing device to measure the pressure created by the air flow. The combination of pressure and fan flow measurements is used to determine the ductwork airtightness. The airtightness of ductwork is useful knowledge when trying to increase energy conservation within a building such as a residential home.

Generally, a typical duct leakage testing system includes three components—a calibrated fan, a register sealing system and a device to measure air flow pressure and building pressure. Supply registers or return air grills are sealed using adhesive tapes, cardboard, or non-adhesive reusable seals. One register or return is left unsealed, and the calibrated fan is then connected to the unsealed register. Pressure is monitored in one of the branches of the ductwork while the calibrated fan delivers air into the system. As air is delivered into the ductwork, pressure builds and forces air out of any holes in the various ductwork connections or through the seams and joints of the furnace or air-handler. The tighter the ductwork system (e.g. fewer holes), the less air required from the fan to create a change in the ductwork pressure.

This method of duct leakage testing requires administration by a certified person; therefore, this method is time consuming, and increases the overall cost of installation. There is, therefore, a need for a method to determine duct leakage that reduces the required time to perform the test.

SUMMARY OF THE DISCLOSED EMBODIMENTS

In one aspect, an HVAC system for determining duct leakage is provided. The HVAC system includes a system controller, and an HVAC unit assembly in communication with the system controller, the HVAC unit assembly comprising a blower compartment door and a blower system. The system controller is configured to determine system leakage data, determine supply leakage data, and determine a duct leakage measurement based in part on the system leakage data and the supply leakage data.

In an embodiment, the HVAC system further includes at least one supply conduit coupled to the HVAC unit assembly and at least one return conduit coupled to the HVAC unit assembly.

In an embodiment, the blower system is configured to operate at a plurality of motor parameters to generate system static pressure data and system airflow data, and operate at a plurality of motor parameters to generate supply static pressure data and supply airflow data. In an embodiment, the plurality of motor parameters includes at least one of a plurality of motor torques and a plurality of motor speeds.

In an embodiment, the system controller is further configured to determine a leakage supply airflow value at a pre-determined leakage static pressure value, determine a leakage system static pressure value based on the leakage supply airflow value, determine a leakage return static pressure based on the leakage supply airflow at the pre-determined leakage static pressure value, determine a return flow constant based on the leakage return static pressure and the leakage supply airflow at the pre-determined leakage static pressure value, determine a leakage return airflow at the pre-determined leakage static pressure value based on the return flow constant, and determine a system leakage value based on the leakage return airflow and the leakage supply airflow. In an embodiment, the pre-determined leakage static pressure value is approximately 0.1 inch water column.

In one aspect, a method for determining duct leakage is provided. The method determine duct leakage in an HVAC system including an HVAC unit assembly including a blower compartment door and a blower system, at least one supply air conduit coupled to the HVAC unit assembly, at least one return air conduit coupled to the HVAC unit assembly, and a system controller operably coupled to the HVAC unit assembly. The method includes operating the system controller to determine system leakage data, operating the system controller to determine supply leakage data, and operating the system controller to determine a duct leakage measurement based in part on the system leakage data and the supply leakage data.

In an embodiment, operating the system controller to determine system leakage data includes restricting airflow in at least one supply air conduit and the at least one return air conduit, and operating the blower system at a plurality of motor parameters to generate system static pressure data and system airflow data. In one embodiment, the plurality of motor parameters comprises at least one of a plurality of motor torques and a plurality of motor speeds.

In an embodiment, operating the system controller to determine supply leakage data includes opening the blower compartment door, and operating the blower system at a plurality of motor parameters to generate supply static pressure data and supply airflow data.

In an embodiment, determining a duct leakage measurement includes operating the system controller to determine a leakage supply airflow value at a pre-determined leakage static pressure value, operating the system controller to determine a leakage system static pressure value based on the leakage supply airflow value, operating the system controller to determine a leakage return static pressure based on the leakage supply airflow at the pre-determined leakage static pressure value, operating the system controller to determine a return flow constant based on the leakage return static pressure and the leakage supply airflow at the pre-determined leakage static pressure value, operating the system controller to determine a leakage return airflow at the pre-determined leakage static pressure value based on the return flow constant, and operating the system controller to determine a system leakage value based on the leakage return airflow and the leakage supply airflow. In an embodiment, the pre-determined leakage static pressure value is approximately 0.1 inch water column.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
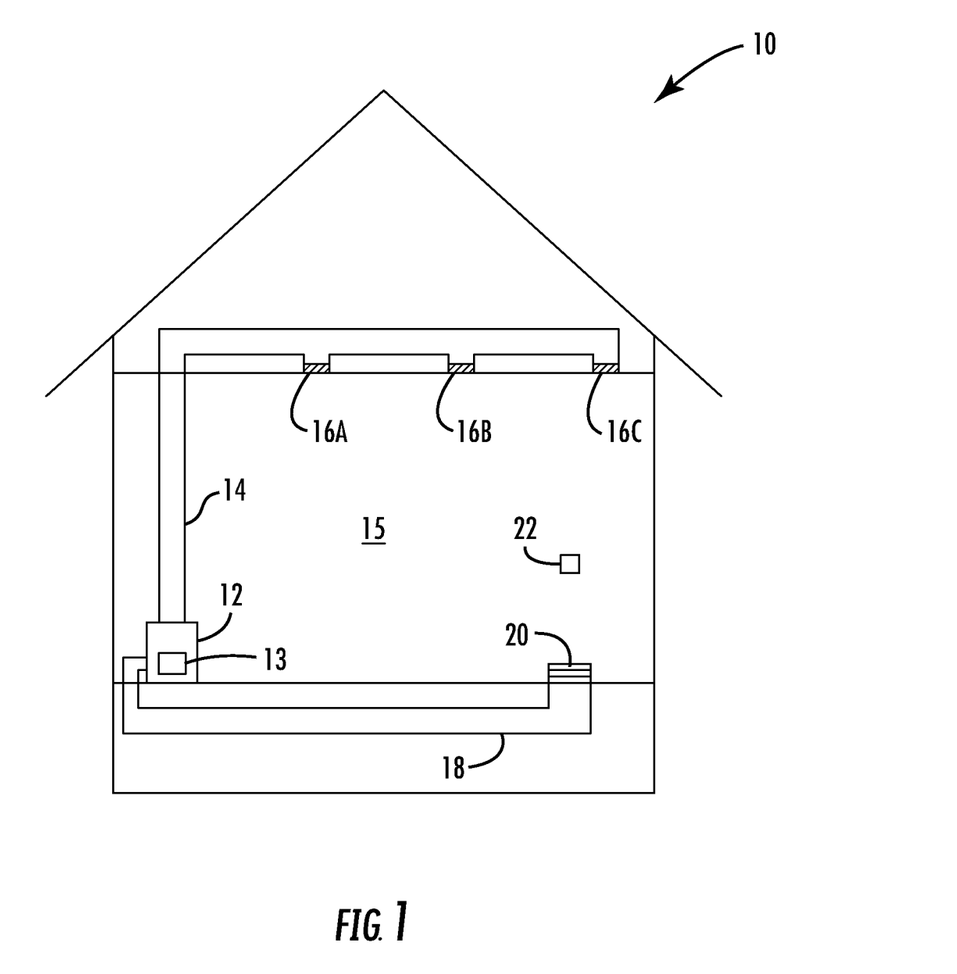
FIG. 1 schematically illustrates an exemplary HVAC system of the present disclosure.
Figure 2:
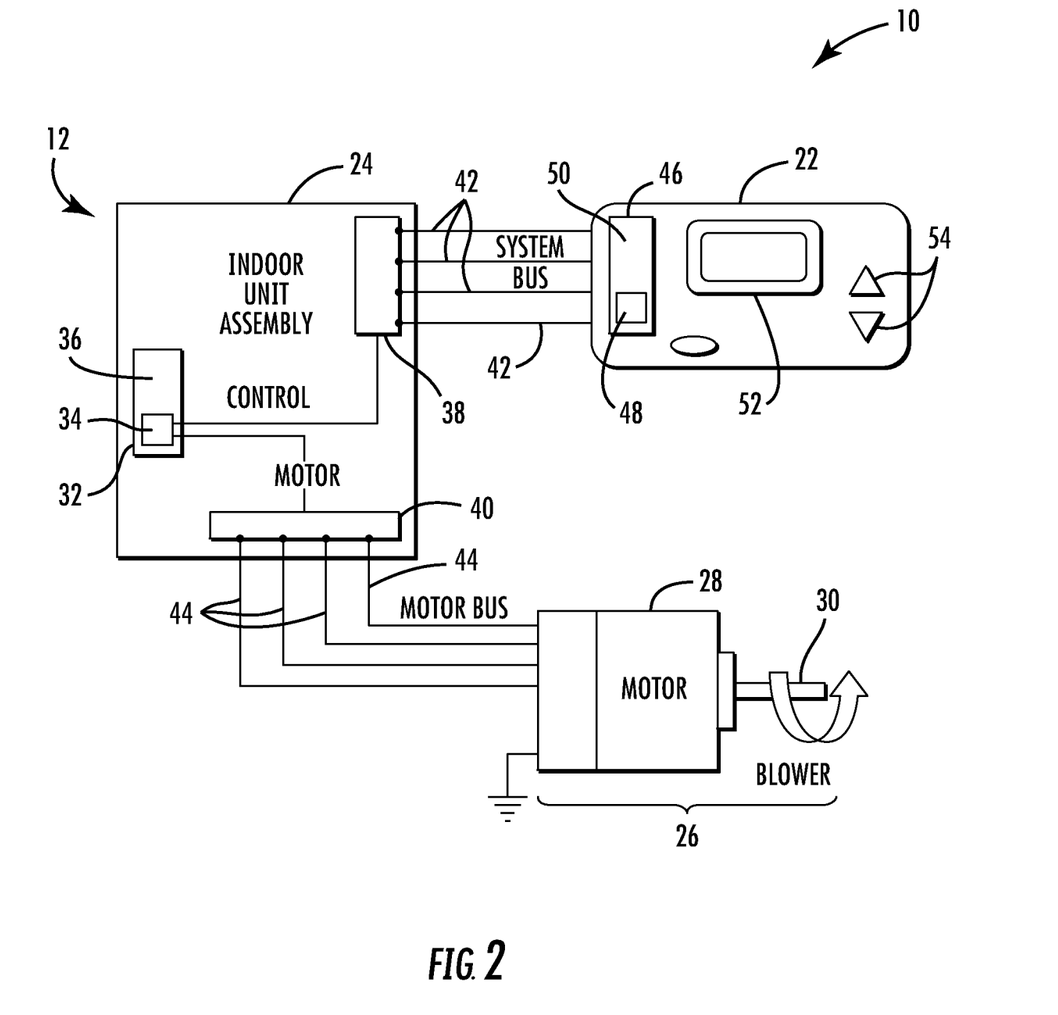
FIG. 2 is a component diagram of an HVAC system according to an embodiment of the present disclosure.

FIG. 1 illustrates an exemplary HVAC system 10 constructed in accordance with the present disclosure. In one embodiment, the HVAC system 10 includes an HVAC unit assembly 12 including a blower compartment door 13. The blower compartment door 13 is configured to provide access to the motor 28 and blower 30 (as shown in FIG. 2). In the embodiment shown, the HVAC unit assembly 12 is located inside a structure, but it will be appreciated that the HVAC unit assembly 12 may be located outside of a structure. At least one supply air conduit 14 is coupled to the HVAC unit assembly 12 to deliver conditioned air to the interior space 15, and at least one supply register vent 16 is coupled to each supply air conduit 14 to direct the flow of the conditioned air. Three supply register vents 16A-C are shown in the illustrated non-limiting embodiment.

The HVAC system 10 further includes at least one return air conduit 18 coupled to the HVAC unit assembly 12, and at least one return register vent 20 coupled to the at least one return air conduit 18. The at least one return air conduit 18 is configured to extract air from the interior space 15 and direct the extracted air to be re-circulated through the HVAC unit assembly 12.

The HVAC system 10 includes a system controller 22 operably coupled to the HVAC unit assembly 12. The system controller 22 is configured to control the operation of the HVAC unit assembly 12 to deliver conditioned air to the interior space 15. The system controller 22 is further configured to provide a determination of duct leakage according to the method disclosed herein.

In one embodiment, as shown in FIG. 2, the HVAC unit assembly 12 includes an HVAC unit assembly control 24, and a blower system 26 which includes a motor 28 and a blower 30. The system controller 22 is shown in direct communication with the HVAC unit assembly control 24, and the HVAC unit assembly control 24 is shown in direct communication with the motor 28 of the blower system 26. The system controller 22 may be in wired or wireless communication with the HVAC unit assembly control 24 and motor 28.

In one embodiment, the HVAC unit assembly control 24 includes an HVAC unit assembly controller 32, which includes a first microprocessor 34 and a first memory 36 for storing certain operational characteristics particular to the given HVAC system 10. As shown, the HVAC unit assembly controller 32 can be in communication with a model control and feedback circuit 38 and with a motor control and feedback circuit 40. The feedback circuit 38 serves to connect the HVAC unit assembly control 24 to the system controller 22 via a system bus 42, and allows signals to be communicated between the HVAC unit assembly control 24 and the system controller 22. Feedback circuit 40 connects the HVAC unit assembly control 24 to the motor 28, and serves to transmit commands to, and receive operation feedback from, the motor 28 via a motor bus 44.

The blower system 26 includes a motor 28 configured to operate at a plurality of motor parameters. In an embodiment, the plurality of motor parameters includes at least one of operational motor torque and operational motor speed. The blower system 26 further includes a blower 30, which has a blower diameter and an operational blower speed. The motor 28 serves to rotate blades or other means of the blower (not shown) to move air through the at least one supply air conduit 14 and the at least one return air conduit 18 associated with HVAC system 10.

In one embodiment, the motor 28 includes a variable speed motor. The motor 28 receives operation requests in the form of an operating airflow volume, or operational motor torque, over the motor bus 44 from the HVAC unit assembly control 24, and reports back its operating speed, or operational motor torque via the motor bus 44 to the HVAC unit assembly control 24.

In one embodiment, the system controller 22 includes a computing element 46 that further includes a second microprocessor 48 and a second memory 50, and may be, for example, capable of storing and reading input data, performing calculations, and reporting the results of calculations. In one embodiment, the system controller 22 includes a user interface element 52, such as a graphical user interface (GUI), a touch screen display, a LCD display, or other means by which a user of the HVAC system 10 can be apprised of system status and/or particular characteristics of the system (such as static pressure). The system controller 22 also optionally has a user input element 54, such as a keypad, keyboard, touch screen or other data input means, which allows a user of the HVAC system 10 to change the operation of the HVAC system 10. In one embodiment, the system controller 22 may in communication with a remote device, such as a mobile phone, and the user interface element 52 and user input element may be located on the remote device.

Figure 3:
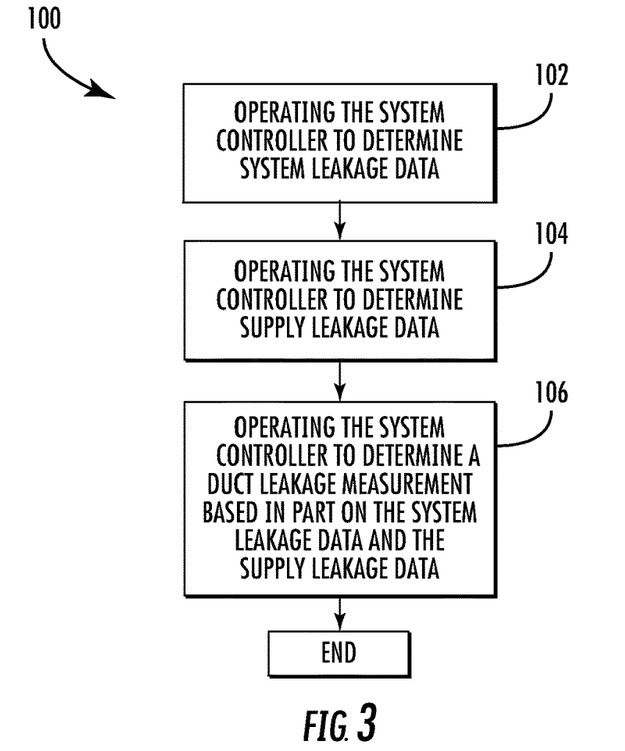
FIG. 3 is a schematic flow diagram of a method for determining duct leakage in an HVAC system according to the present disclosure.
Figure 4:
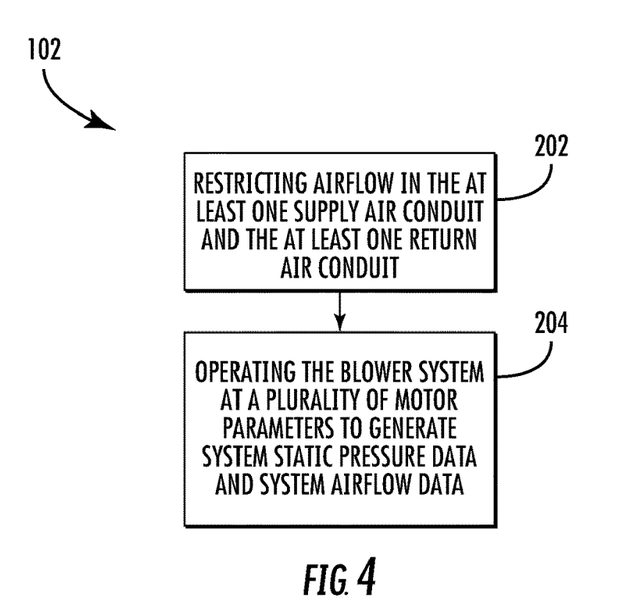
FIG. 4 is a schematic flow diagram of a method for determining duct leakage in an HVAC system according to the present disclosure.

FIG. 3 illustrates a method 100 for determining duct leakage in an HVAC system 10. The method 100 includes the step 102 of operating the system controller 22 to determine system leakage data. In an embodiment, as shown in FIG. 4, operating the system controller 22 to determine system leakage data includes step 202 of restricting airflow in the at least one supply air conduit 14 and the at least one return air conduit 18, and step 204 of operating the blower system 26 at a plurality of motor parameters to generate system static pressure data and system airflow data. In an embodiment, the plurality of motor parameters includes at least one of a plurality of motor torques and a plurality of motor speeds.

Airflow may be restricted in the at least one supply air conduit 14 by closing or sealing each of the at least one supply register vents 16A-C, and airflow may be restricted in the at least one return air conduits 18 by closing or sealing the at least one return register vent 20. The system leakage data in a section of the HVAC system 10 external to the HVAC unit assembly 12 is determined by the system controller 22 in one embodiment, although the determination of the system leakage data could be performed at any number of locations in the HVAC system 10 that include processing devices, such as at the HVAC unit assembly control 24, or a remote device in communication with the HVAC system 10, such as a mobile phone.

In order for system controller 22 to determine the system leakage data in the illustrative embodiment shown in FIG. 2, system controller 22 first receives a value for system volume airflow rate (of air flowing through the HVAC system 10), and values for blower diameter and blower speed from the HVAC unit assembly control 24 over the system bus 42. In one embodiment, the HVAC unit assembly control 24 commands the blower system 26 to operate at a plurality of motor parameters (e.g., three different operational motor torques or three different airflow rates to name a couple of non-limiting examples) to determine the system leakage data across the HVAC system 10.

The values for system volume airflow rate, blower diameter, and blower speed could be stored in the second memory 50 of the system controller 22 long before calculation, though in some embodiments, these values, especially for system volume airflow rate and blower speed, are received at the system controller 22 from the HVAC unit assembly control 24 contemporaneously, or nearly contemporaneously, with the determination of the system static pressure data by the system controller 22. As is known in the art, the system controller 22 employs an algorithm including unit characteristic constants from the HVAC unit assembly control 24 to determine the system static pressure data external to the HVAC unit assembly 12.

Figure 5:
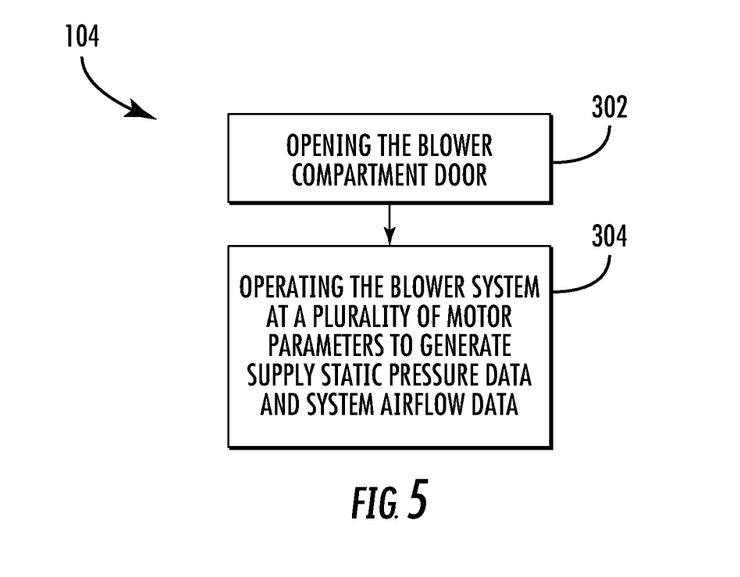
FIG. 5 is a schematic flow diagram of a method for determining duct leakage in an HVAC system according to the present disclosure.

The method 100 further includes the step 104 of operating the system controller 22 to determine supply leakage data. In an embodiment, as shown in FIG. 5, operating the system controller 22 to determine supply leakage data includes step 302 of opening the blower compartment door 13 and step 304 of operating the blower system 26 at a plurality of motor parameters to generate supply static pressure data and supply airflow data.

Opening the blower compartment door 13 allows the system controller 22 to determine the leakage flow rate of the at least one supply conduit 14 because the airflow from the at least one return conduit 18 is allowed to escape through the blower compartment door 13. After the system controller 22 completes step 102 of determining the system leakage data, the HVAC installer may open or remove the blower compartment door 13, and operate the system controller 22 to direct the blower system 26 to operate at different operational motor torques to determine the supply static pressure data and supply airflow data.

Figure 6:
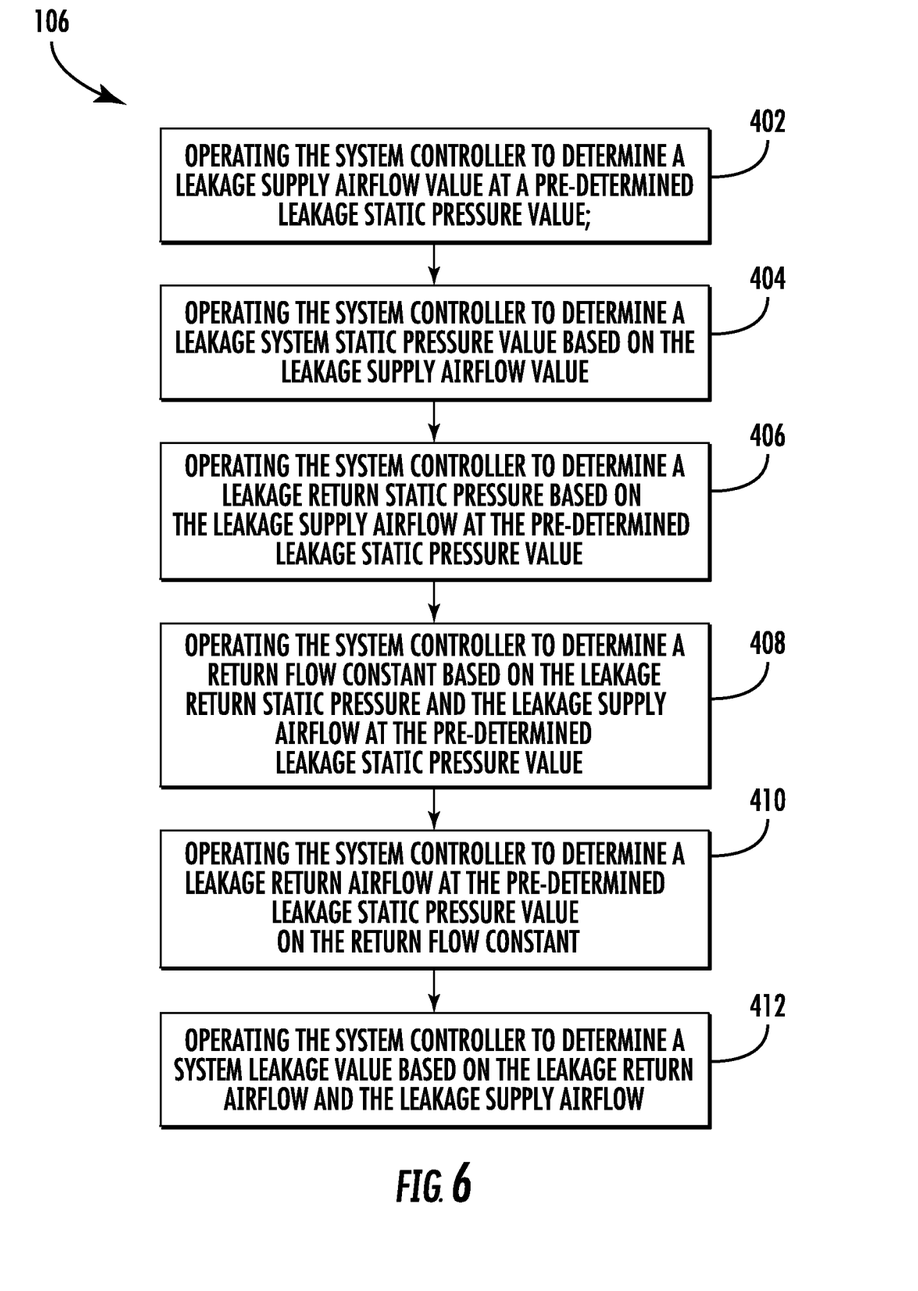
FIG. 6 is a schematic flow diagram of a method for determining duct leakage in an HVAC system according to the present disclosure.

The method 100 further includes step 106 of operating the system controller 22 to determine a duct leakage measurement, for the system 10, based in part on the system leakage data and the supply leakage data. In an embodiment, as shown in FIG. 6, determining a duct leakage measurement includes step 402 of operating the system controller 22 to determine a leakage supply airflow value at a pre-determined leakage static pressure value. In an embodiment, the pre-determined leakage static pressure value is approximately 0.1 inch water column. It will be appreciated that the pre-determined leakage static pressure value of approximately 0.1 inch water column was chosen based on the present standard for measuring duct leakage; however, the pre-determined leakage static pressure value may be greater than or less than approximately 0.1 inch water column.

Determining a duct leakage measurement further includes step 404 of operating the system controller 22 to determine a leakage system static pressure value based on the leakage supply airflow value, step 406 of operating the system controller 22 to determine a leakage return static pressure based on the leakage supply airflow at the pre-determined leakage static pressure value, step 408 of operating the system controller 22 to determine a return flow constant based on the leakage return static pressure and the leakage supply airflow at the pre-determined leakage static pressure value. The flow constant is derived from a flow and system pressure curve as a function of power-law. Determining a duct leakage measurement further includes step 410 of operating the system controller 22 to determine a leakage return airflow at the pre-determined leakage static pressure value based on the return flow constant, and step 412 of operating the system controller 22 to determine a system leakage value based on the leakage return airflow and the leakage supply airflow.

An example of the method 100 may be such that an HVAC installer closes or seals the at least one supply register vents 16A-C and the at least one return register vent 20. The HVAC installer operates the system controller 22 and blower system 26 to determine system leakage data (e.g., system static pressure and system airflow data) by operating the blower system 26 at three different operational torques.

Figure 7:
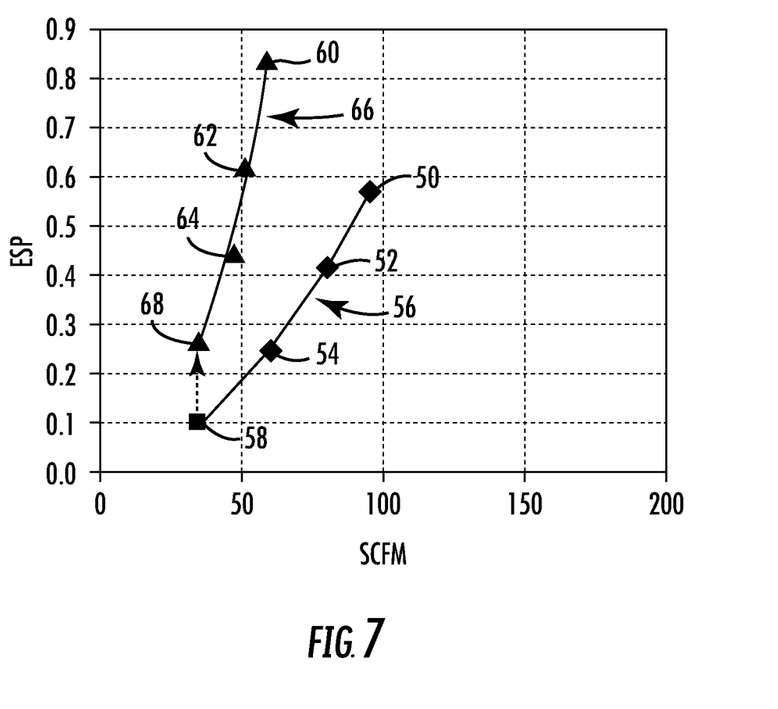
FIG. 7 is an exemplary graph depicting the system leakage data and supply leakage data according to the present disclosure.

As shown in the illustrative chart of FIG. 7, with airflow shown on the x-axis, and static pressure shown on the y-axis, system leakage data points 60, 62, and 64 are created from operating the blower system 26 at three different operational torques with restricting airflow in the at least one supply air conduit and the at least one return air conduit with the blower compartment door 13 closed. Data point 60 shows an airflow of approximately 60 SCFM at an ESP of approximately 0.84 inch water column, data point 62 shows airflow of approximately 50 SCFM at an ESP of approximately 0.62 inch water column, and point 64 shows an airflow of approximately 46 SCFM at an ESP of approximately 0.44 inch water column.

The HVAC installer opens or removes the blower compartment door 13, and operates the system controller 22 and blower system 26 to determine supply leakage data (e.g., supply static pressure and supply airflow data) by operating the blower system 26 at three new operational torques. The system controller 22 determines a leakage supply airflow value at approximately 0.1 inch water column by using the supply static pressure and supply airflow data, and fan law and system curve principles.

As shown in the illustrative chart of FIG. 7, with airflow shown on the x-axis, and static pressure shown on the y-axis, supply leakage data points 50, 52, and 54. Data point 50 shows an airflow of approximately 95 standard cubic feet per minute (SCFM) at an external static pressure (ESP) of approximately 0.57 inch water column, data point 52 shows an airflow of approximately 80 SCFM at an ESP of approximately 0.42 inch water column, and data point 54 shows an airflow of approximately 60 SCFM at an ESP of approximately 0.25 inch water column. Line 56 is derived from data points 50, 52, and 54 using the equation:

$$P = K \times Q^n$$

Where P is the external static pressure, K is the flow constant, Q is the airflow. Using best fit techniques with data points 50, 52, and 54, K and n are computed to be $1.91 \times 10^{-4}$ and 1.775, respectively. In an embodiment, n may be a value greater than or equal to approximately 1.5 and less than or equal to approximately 2.5. It will be appreciated that n may be a value less than approximately 1.5 or greater than 2.5. Line 56 is used to determine data point 58 indicating a leakage supply airflow value (e.g., approximately 34 SCFM) at an external static pressure of approximately 0.1 inch water column. It will be appreciated that the order of determining system leakage data and supply leakage data may be reversed.

The system controller 22 determines a leakage system static pressure value based on the pre-determined leakage static pressure value and the leakage system static pressure. Using the aforementioned equation, line 66 is derived from data points 60, 62, and 64 to determine data point 68 indicating a leakage system static pressure value at the same airflow as the leakage supply airflow (e.g., approximately 34 SCFM). In this instance, the leakage system static pressure value is approximately 0.26 inch water column.

It will be appreciated that in a balanced HVAC system 10 the total system static pressure is equal to the static pressure on the supply side plus the static pressure on the return side, or illustrated by the equation:

$$P_T = P_S + P_R$$

Therefore, to have an airflow of approximately 34 SCFM in the at least one return conduit 18, the static pressure in the at least one return conduit 18, $P_R$, would need to equal approximately 0.16 inch water column (0.16=0.26−0.1).

The system controller 22 determines a return flow constant based on the leakage return static pressure and the leakage supply airflow at the pre-determined leakage static pressure value. The return flow constant may be determined by the equation:

$$K_R = P_R / Q_{S0.1}{}^n = 0.16/34^{1.7775} = 3.06 \times 10^{-4}$$

The system controller 22 further determines a leakage return airflow at the pre-determined leakage static pressure value based on the return flow constant. The leakage return airflow may be determined by the equation:

$$Q_{R0.1} = \left(\frac{0.1}{K_R}\right)^{\frac{1}{n}} = \left(\frac{0.1}{3.06 \times 10^{-4}}\right)^{\frac{1}{1.775}}$$

Therefore, the leakage return airflow at 0.1 inch is approximately 26 SCFM. Now that the leakage return airflow has been established, the system controller 22 can determine a system leakage value based on the leakage return airflow and the leakage supply airflow. The system leakage value is may be determined by the equation:

$$Q_{TOT0.1} = Q_{S0.1} + Q_{R0.1}$$

Therefore, the determined system leakage for the HVAC system 10 is approximately 60 SCFM at an external static pressure of approximately 0.1 inch water column in the at one supply conduit 14 and the at least one return conduit 18.

It will be appreciated that the system controller 22 may perform an autonomous test to determine the duct leakage measurement of the HVAC system 10 without the need of external equipment; thus, reducing the time to verify the system leakage of the HVAC system 10.

While the present disclosure has been illustrated and described in detail in the drawings and foregoing description, the same is to be considered as illustrative and not restrictive in character, it being understood that only certain embodiments have been shown and described and that all changes and modifications that come within the spirit of the present disclosure are desired to be protected.

What is claimed is:

1. A method for determining duct leakage in an HVAC system including an HVAC unit assembly including a blower compartment door and a blower system, at least one supply air conduit coupled to the HVAC unit assembly, at least one return air conduit coupled to the HVAC unit assembly, and a system controller operably coupled to the HVAC unit assembly, the method comprising the steps of:
    (a) operating the system controller to determine system leakage data;
    (b) operating the system controller to determine supply leakage data; and
    (c) operating the system controller to determine a duct leakage measurement based in part on the system leakage data and the supply leakage data;
    wherein step (a) comprises:
    operating the blower system at a first plurality of motor parameters to generate system static pressure data and system airflow data after airflow in the at least one supply air conduit and the at least one return air conduit is restricted by closing the at least one supply air conduit and the at least one return air conduit.

2. The method of claim 1, wherein step (b) comprises:
    operating the blower system at a second plurality of motor parameters to generate supply static pressure data and supply airflow data after the blower compartment door is opened.

3. The method of claim 2, wherein the second plurality of motor parameters comprises at least one of a plurality of motor torques and a plurality of motor speeds.

4. The method of claim 2, wherein the first plurality of motor parameters and the second plurality of motor parameters are the same.

5. A method for determining duct leakage in an HVAC system including an HVAC unit assembly including a blower compartment door and a blower system, at least one supply air conduit coupled to the HVAC unit assembly, at least one return air conduit coupled to the HVAC unit assembly, and a system controller operably coupled to the HVAC unit assembly, the method comprising the steps of:
    (a) operating the system controller to determine system leakage data;
    (b) operating the system controller to determine supply leakage data; and
    (c) operating the system controller to determine a duct leakage measurement based in part on the system leakage data and the supply leakage data;
    wherein determining a duct leakage measurement comprises:

(i) operating the system controller to determine a leakage supply airflow value at a pre-determined leakage static pressure value;

(ii) operating the system controller to determine a leakage system static pressure value based on the leakage supply airflow value;

(iii) operating the system controller to determine a leakage return static pressure based on the leakage supply airflow at the pre-determined leakage static pressure value;

(iv) operating the system controller to determine a return flow constant based on the leakage return static pressure and the leakage supply airflow at the pre-determined leakage static pressure value;

(v) operating the system controller to determine a leakage return airflow at the pre-determined leakage static pressure value based on the return flow constant; and (vi) operating the system controller to determine a system leakage value based on the leakage return airflow and the leakage supply airflow.

6. The method of claim 5, wherein the pre-determined leakage static pressure value is approximately 0.1 inch water column.

7. An HVAC system for determining duct leakage comprising:
a system controller;
an HVAC unit assembly in communication with the system controller, the HVAC unit assembly comprising a blower compartment door and a blower system;
at least one supply conduit coupled to the HVAC unit assembly; and
at least one return conduit coupled to the HVAC unit assembly
wherein the system controller is configured to:
(a) determine system leakage data;
(b) determine supply leakage data; and
(c) determine a duct leakage measurement based in part on the system leakage data and the supply leakage data;

wherein determining system leakage data comprises operating the blower system at a first plurality of motor parameters to generate system static pressure data and system airflow data after airflow in the at least one supply air conduit and the at least one return air conduit is restricted by closing the at least one supply air conduit and the at least one return air conduit.

8. The HVAC system of claim 7, wherein the blower system is configured to:
(i) operate at a first plurality of motor parameters to generate system static pressure data and system airflow data; and
(ii) operate at a second plurality of motor parameters to generate supply static pressure data and supply airflow data.

9. The HVAC system of claim 8, wherein the first plurality of motor parameters comprises at least one of a plurality of motor torques and a plurality of motor speeds.

10. The HVAC system of claim 8, wherein the system controller is further configured to:
(i) determine a leakage supply airflow value at a pre-determined leakage static pressure value;
(ii) determine a leakage system static pressure value based on the leakage supply airflow value;
(iii) determine a leakage return static pressure based on the leakage supply airflow at the pre-determined leakage static pressure value;
(iv) determine a return flow constant based on the leakage return static pressure and the leakage supply airflow at the pre-determined leakage static pressure value;
(v) determine a leakage return airflow at the pre-determined leakage static pressure value based on the return flow constant; and
(vi) determine a system leakage value based on the leakage return airflow and the leakage supply airflow.

11. The HVAC system of claim 10, wherein the pre-determined leakage static pressure value is approximately 0.1 inch water column.

* * * * *